May 10, 1955

L. M. CARVER
ELECTRICALLY VARIABLE REACTANCE
KEYING OR SWITCHING APPARATUS
Filed June 25, 1952

2,708,219

Inventor
LAWRENCE M. CARVER

By

Curtis, Morris & Safford
Attorneys

United States Patent Office 2,708,219

Patented May 10, 1955

2,708,219

ELECTRICALLY VARIABLE REACTANCE KEYING OR SWITCHING APPARATUS

Lawrence M. Carver, Stamford, Conn., assignor to C. G. S. Laboratories, Inc., Stamford, Conn., a corporation of Connecticut Application June 25, 1952, Serial No. 295,578

9 Claims. (Cl. 178—66)

Figure 1:
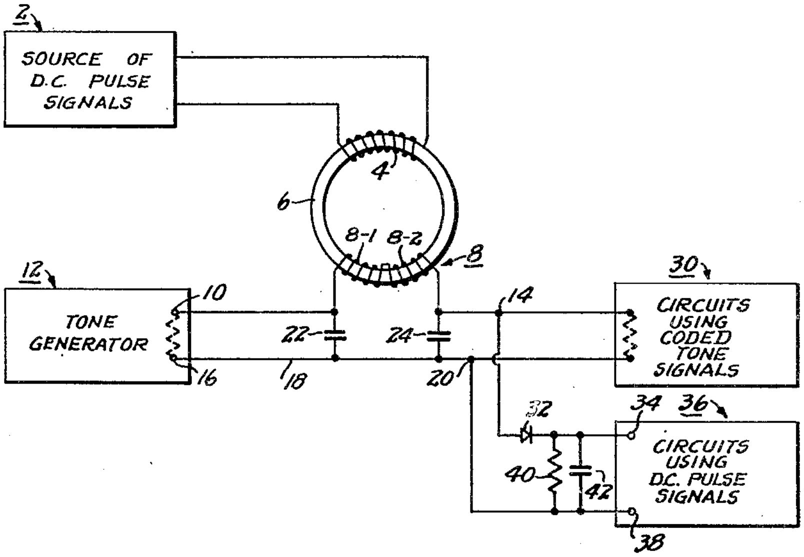

This invention relates to switching and keying devices and more particularly to apparatus for isolating two direct current pulse-transmitting circuits such as are used in teletypewriter systems.

In teletypewriter transmission systems, each character to be transmitted is represented by a code consisting of a series of spaced pulses. In the usual simplex system, each letter or character requires a transmission time of 163 milliseconds including an interval of 31 milliseconds for the separation of successive characters. The 132 milliseconds period required for the actual transmission of the code is divided into six equal time intervals of 22 milliseconds each. During each of these periods, a pulse signal may either be present or absent and each character is represented by a unique combination of a predetermined number of signal pulses occurring within selected ones of the 22 millisecond intervals.

Intervals in which no signal occurs are called "spaces" and those during which a signal is present are called "marks." Thus, a particular character is represented by a unique series of successive spaces and marks. The mark intervals can be represented by a change in the D.-C. level on the transmission line, called "D. C." pulses, or by the presence of an alternating current signal, called "tone" signals, both types of mark indications may be used in different parts of a single system.

Thus, the mark signals may be represented at one point in a system by a particular magnitude of direct current and at other points by an alternating current. Thus, apparatus must be provided for changing the pulses from D. C. to tone and from tone to D. C.

In addition, it is often important to transfer D. C. pulses from one circuit to another without any direct-current connection between the two circuits. Such isolation is important where the characteristics of two pieces of apparatus are such that they cannot be connected directly together, for example, because interfering circuit connections would be made through the common ground circuit.

Several ways of attaining the direct current isolation have been proposed. For example, the incoming D. C. pulses may be used to control the field of a magnetic diode. The output circuit is connected between the plate and cathode of the diode. This arrangement is satisfactory for many isolation applications, but it can deliver only low-power signals and the magnetic diodes are relatively expensive.

The isolation can be achieved also with relays or other electro-mechanical devices, but these require adjustment from time to time and are not capable of following high speed signals reliably.

In accordance with the present invention, a switching mechanism is provided that has no moving parts, is capable of high speed operation, and which overcomes to a large extent the disadvantages of earlier arrangements.

In a preferred embodiment of the invention, a filter circuit having an inductor with a core of ferromagnetic ceramic material is connected to control the magnitude of a tone signal. The D. C. input pulses are connected to a winding that controls the magnetic saturation of the core and accordingly the effective inductance of the inductor and the operating range of the filter. When no pulses are present on the transmission line, the filter blocks the tone signal; when a pulse is received the operating range of the filter changes to permit the tone signal to pass. The tone signal can then be rectified to produce D. C. pulses corresponding to the incoming pulses.

Figure 2:
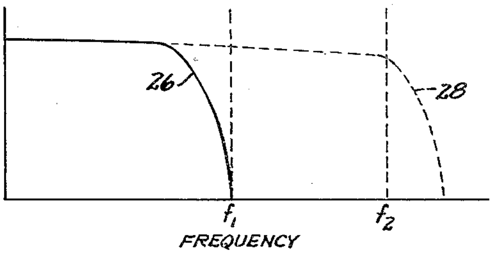
Figure 3:
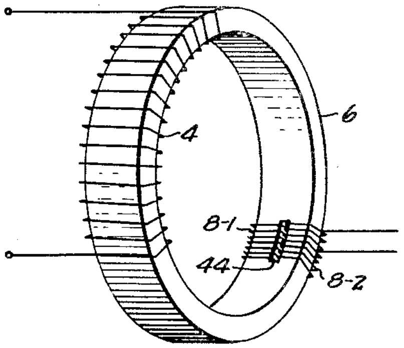

Certain of the various aspects, advantages, and objects of the present invention will be further pointed out in or apparent from the following description of a preferred embodiment of the invention considered in connection with the accompanying drawings, in which:

Figure 1 is a simplified schematic diagram of a D. C.-to-D. C. isolation system embodying the invention;

Figure 2 is a graph for aid in explaining the operation of the apparatus of Figure 1; and Figure 3 is a diagrammatic representation of a controllable inductor suitable for use in connection with Figure 1.

As shown in Figure 1, the D. C. teletypewriter pulse signals are coupled from a source, diagrammatically indicated at 2, to a control winding 4 on a ring core 6 of ferromagnetic ceramic material. The source 2 may be adjacent teletypewriter apparatus or it may represent transmission lines from a remote transmitter or repeater. The core 6 is formed of material frequently referred to as "ferrite" and is described, for example, in U. S. Patents 2,452,529; 2,452,530; and 2,452,531 to Snoeck. This material has high magnetic permeability and permits a wide control range as will be explained presently.

The core 6 also carries a winding 8 which is formed of two series-connected sections 8–1 and 8–2. The two sections of this winding are arranged so that mutual coupling between the winding 8 and the winding 4 is minimized.

One end of the winding 8 is connected to an output terminal 10 of a constant-frequency tone generator indicated in block form at 12. The other end of this winding is connected to an output terminal 14. The other terminal 16 of the generator 12 is connected by a lead 18 directly to an output terminal 20.

Two condensers 22 and 24 are connected respectively between opposite ends of the winding 8 and the lead 18 so as to form a low-pass filter between the tone generator 12 and the output terminals 14 and 20. The cut-off frequency of this filter depends upon the inductance of winding 8 which in turn depends upon the extent to which the core 6 is saturated by current through the winding 4.

For example, the condensers 22 and 24 may have equal values and be selected to provide a cut-off frequency of 800 cycles with no current through the winding 4. If the tone signal of the generator 12 is a signal of 3,000 cycles per second, the filter will prevent this tone from reaching the output terminals 14 and 20.

Now assume a D. C. pulse signal to be applied to the winding 4, partially saturating the core 6. This lowers the permeability of the core and decreases inductance of the winding 8. This decrease in inductance raises the cut-off frequency of the low pass filter. Thus, the presence of the pulse signal may increase the cut-off frequency of the filter from 800 to 4,000 cycles per second. The 3,000 cycle tone signal now appears at the output terminals 14 and 20.

Figure 2 indicates the operation of the low pass filter. With no current in winding 4, the output voltage of the filter as a function of frequency is indicated by the solid line 26; signals having a frequency higher than "$f_1$" are blocked by the filter. When the pulse current passes through the winding 4, the output voltage of the filter is represented by the broken line 28; all signals having a frequency up to "$f_2$" being passed by the filter with little attenuation. Thus, the signal from the tone generator 12 will have a frequency between "$f_1$" and "$f_2$" in order to obtain the desired switching action.

Although the core 6 may be formed of permeable materials other than ferromagnetic ceramic material, there are important advantages in the use of these ferrite materials: It is important that the frequencies "$f_1$" and "$f_2$" be separated as widely as possible in order to provide maximum attenuation and also to permit the system to be used with tone generators having widely different frequencies. With these ceramic materials, a ten-to-one range in the cut-off frequency of the filter can be achieved. In most applications, a change in cut-off frequency of at least five-to-one is desirable. Moreover, the device must respond rapidly to the pulse signals so that the wave shape of the pulse is preserved. These ceramic materials provide the necessary rapid response. In addition, these materials have high permeability so that minimum space is required and provide a relatively high Q circuit so that the filter has a sharp cut-off.

The keyed tone signals appearing at the terminals 14 and 20 may be connected to any desired apparatus, diagrammatically indicated at 30, capable of making use of the tone signals. However, if D. C. pulse circuits are to be used, the tone signals are rectified and filtered to produce D. C. pulse signals.

To this end, the terminal 14 is connected through a half-wave rectifier 32 to a terminal 34 of apparatus, diagrammatically indicated at 36, capable of making use of D. C. pulse signals. The other output terminal 20 is connected to a terminal 38 of the apparatus 36. A direct current circuit for the rectifier 32 is provided by a resistor 40 connected between the output of the rectifier 32 and the terminal 20.

In order to prevent components of the tone signal from being applied across the terminals 34 and 38, a filter, represented by a condenser 42 is connected in parallel with the resistor 40. This filter offers a low impedance path for signal components of the frequency of the tone signal but has no significant effect on the keying frequency.

Figure 3 illustrates the arrangement of the winding 8 on the core 6. The winding section 8–1 is wound through a slot 44 in the core 6 and extends around one edge of the core; the other winding section 8–2 also extends through the slot 44 but is wound around the opposite rim portion of the core. These two winding sections 8–1 and 8–2 are connected together so that flux lines produced by current flowing through the winding 8 form closed loops around the slot 44. With this arrangement there is negligible mutual coupling between the windings. Other winding arrangements may be used such, for example, as are described by De Witz in U. S. patent applications Serial Numbers 213,548 and 283,186, filed, respectively, March 2, 1951 and April 19, 1952.

Thus, D. C. pulse signals are coupled from the source 2 to the apparatus 36 without significant change in the shape or character of the pulses, with no conductive connection between the two pieces of apparatus, and without complicated equipment.

From the foregoing, it will be apparent that the coupling system embodying my invention is well-adapted to attain the ends and objects set forth and to be modified readily so as to best suit the requirements and characteristics of each particular use while at the same time being capable of substantially universal design so that a single unit can be employed without modification in systems having widely diverse characteristics.

What is claimed is:

1. In a teletypewriter system, apparatus for coupling D.-C. pulse signals from one circuit to another and maintaining isolation between the two circuits, comprising a source of D.-C. pulse signals, a ferromagnetic ceramic core, a control winding on said core connected to said source for saturating said core in accordance with the variations of the pulse signals, a source of constant-frequency signals, a frequency-selective filter connected to said source of constant-frequency signals and including a signal winding coupled to said core, said signal winding being variable in inductance in accordance with the saturation of said core thereby to vary the frequency-selective characteristics of said filter, and a rectifier connected to the output of said filter.

2. In a teletypewriter system, apparatus for coupling unidirectional signals from one circuit to another and maintaining isolation between the two circuits, comprising a source of unidirectional signals, a ring core of saturable magnetic material, a control winding on said core connected to said source for saturating said core in accordance with the variations of the unidirectional signals, a source of constant-frequency signals, and a frequency-selective filter connected to said source of constant-frequency signals and including a signal winding coupled to said core, said signal winding being variable in inductance in accordance with the saturation of said core thereby to vary the frequency-selective characteristics of said filter, said filter being arranged to pass said constant-frequency signals when no unidirectional signal voltage is applied to said control winding and to reject said constant frequency signals when unidirectional voltage is applied to said control winding.

3. Apparatus for coupling D.-C. pulse signals from one circuit to another and maintaining isolation between the two circuits, comprising a source of D.-C. signals, a ferromagnetic ceramic core, a control winding on said core connected to said source for saturating said core in accordance with the variations of the pulse signals, a source of constant-frequency signals, and a low pass frequency-selective filter connected to said source of constant-frequency signals and including a signal winding coupled to said core, said signal winding being variable in inductance in accordance with the saturation of said core thereby to vary the cut-off frequency of said filter, the cut-off frequency of said filter being shifted above and below the frequency of said constant frequency signals as the pulse signal voltages are applied to and removed from said signal winding.

4. In a teletypewriter system, apparatus for coupling D.-C. pulse signals from one circuit to another and maintaining isolation between the two circuits, comprising a source of D.-C. pulse signals, a ferromagnetic ceramic core, a control winding on said core connected to said source for saturating said core in accordance with the variations of the pulse signals, a source of constant-frequency signals, a frequency-selective filter connected to said source of constant-frequency signals and including a signal winding coupled to said core, said signal winding being variable in inductance in accordance with the saturation of said core thereby to vary the frequency-selective characteristics of said filter, said signal winding including two series sections connected in opposition with respect to flux produced by said control winding so as to prevent mutual coupling between said control winding and said signal winding, and a rectifier connected to the output of said filter.

5. Apparatus for coupling signals from one circuit to another and maintaining D.-C. isolation between the two circuits, comprising a source of signals to be relayed, a core of magnetically saturable material, a control winding on said core connected to said source for saturating said core in accordance with the variations of the signals to be relayed, a source of alternating-current signals, a frequency-selective filter connected to said source of alternating-current signals and including a signal winding coupled to said core, said signal winding being variable in inductance in accordance with the saturation of said core thereby to vary the frequency-selective characteristics of said filter, and a rectifier connected to the output of said filter.

6. A frequency selective filter system comprising a core of ferromagnetic ceramic material, a control winding connectible to a source of control current, said winding being wound on said core and arranged to vary its magnetic saturation in accordance with the magnitude of the control current, a source of constant-frequency current, a frequency-selective filter including a signal winding coupled to said core so that the inductance of the signal winding varies with the magnetic saturation of the core, the frequency-selective characteristics of said filter being dependent upon the inductance of said signal winding, means connecting said source of constant-frequency current to said filter, a rectifier connected to the output of said filter, and a low pass filter connected to said rectifier and arranged to prevent the passage of said constant-frequency current.

7. In a teletypewriter system, the method of transferring D.-C. pulse signals between two circuits not connected by a current-conductive path comprising the steps of partially saturating a ferromagnetic ceramic core in accordance with the instantaneous value of the incoming D.-C. pulse signals, generating a constant-frequency signal, applying the constant frequency signal to a frequency-selective filter including an inductor incorporating said core, varying the frequency selective characteristics of said filter in accordance with the saturation of said core, and rectifying the constant-frequency signals passed by said filter.

8. Apparatus for effectively coupling D.-C. pulse signals from one circuit to another and maintaining isolation between the two circuits, comprising a source of D.-C. pulse signals, a source of constant-frequency signals, a low-pass frequency selective filter having input and output circuits, said input circuit being connected to said source of constant-frequency signals, an electrically-variable reactance element in said filter, a variable-reactance control circuit connected to said variable reactance element and to said D.-C. signal source, the cut-off frequency of said filter being shifted from a first lower cut-off frequency to a second higher cut-off frequency when a D.-C. pulse signal energizes said variable-reactance control circuit, and a pulse-responsive circuit connected to the output of said filter, said first cut-off frequency being below the frequency of said constant-frequency source, said second cut-off frequency being above the frequency of said constant frequency source, whereby said pulse-responsive circuit is energized by signals from said constant-frequency source in accordance with said D.-C. pulses.

9. Apparatus for effectively coupling D.-C. pulse signals from one circuit to another and maintaining isolation between the two circuits, comprising a source of D.-C. pulse signals, a source of constant-frequency signals, a low-pass frequency selective filter having input and output circuits, said input circuit being connected to said source of constant-frequency signals, an electrically-variable reactance element in said filter, a variable-reactance control circuit connected to said variable reactance element and to said D.-C. signal source, the cut-off frequency of said filter being shifted from a first lower cut-off frequency to a second higher cut-off frequency when a D.-C. pulse signal energizes said variable-reactance control circuit, and a rectifier and D.-C. pulse-responsive circuit connected to the output of said filter, said first cut-off frequency being below the frequency of said constant-frequency source, said second cut-off frequency being above the frequency of said constant frequency source, whereby said D.-C. pulse-responsive circuit is energized by rectified signals from said constant-frequency source in accordance with said D.-C. pulses from said source.

References Cited in the file of this patent

UNITED STATES PATENTS

| | | |
|---|---|---|
| 2,129,920 | FitzGerald | Sept. 13, 1938 |
| 2,452,529 | Snoek | Oct. 26, 1948 |
| 2,481,644 | Callaway | Sept. 13, 1949 |
| 2,606,966 | Pawley | Aug. 12, 1952 |

OTHER REFERENCES

Serial No. 383,526, Weis (A. P. C.), published May 18, 1943.